United States Patent [19]

Mahany, II

[11] Patent Number: 4,725,316
[45] Date of Patent: Feb. 16, 1988

[54] COLOR COMPOSITIONS AND METHOD

[75] Inventor: Thomas E. Mahany, II, Novato, Calif.

[73] Assignee: Eldon Enterprises Ltd., Novato, Calif.

[21] Appl. No.: 721,428

[22] Filed: Apr. 9, 1985

[51] Int. Cl.[4] ............................................. C08K 13/00
[52] U.S. Cl. ............................ 106/288 B; 106/288 Q
[58] Field of Search ............... 106/23, 288 B, 288 Q, 106/308 B, 308 Q, 309

[56] References Cited

U.S. PATENT DOCUMENTS

| Re. 29,662 | 6/1978 | Yocom | 252/301.4 S |
|---|---|---|---|
| 254,312 | 2/1882 | Heaton et al. | 106/288 Q |
| 2,013,417 | 9/1935 | Meister | 106/5 |
| 2,089,413 | 8/1937 | Paine et al. | 8/6 |
| 2,285,464 | 6/1942 | Ruthruff | 23/135 |
| 2,475,437 | 7/1949 | Stern | 252/301.4 |
| 2,653,109 | 9/1953 | Switzer | 117/33.5 |
| 2,787,558 | 4/1957 | Wadely | 117/33.5 |
| 2,895,917 | 7/1959 | Gaunt | 252/301.2 |
| 3,445,551 | 5/1969 | Griffin | 264/21 |
| 3,555,087 | 1/1971 | Grosso | 260/558 |
| 3,714,181 | 1/1973 | Lantos | 260/309.6 |
| 3,838,063 | 9/1974 | Foss | 252/301.2 R |
| 4,208,300 | 6/1980 | Gravisse | 252/301.33 |
| 4,211,813 | 7/1980 | Gravisse et al. | 428/263 |
| 4,446,048 | 5/1984 | Ranby et al. | 252/301.4 S |

*Primary Examiner*—Amelia Burgess Yarbrough
*Attorney, Agent, or Firm*—Robbins & Laramie

[57] ABSTRACT

A method of preparing a desired photoluminescent color pigment having a predictable color and spectral response under ambient illuminating radiation and in the dark, comprising the steps of: choosing at least one target color having a dominant wavelength and selected spectral response in the presence of ambient illuminating radiation and in the dark; and mixing by weight about 87-97.8% phosphorescent pigments, about 2-10% fluorescent pigments and about 0.2-3% common pigments, each having a dominant wavelength and spectral response near said target color, to produce said spectral response.

15 Claims, 3 Drawing Figures

FIG. I.
COLOR WHEEL
☒=PRIMARY COLORS

FIG. 2.
COLOR CHART

FIG. 3.
C.I.E. CHART
2° OBSERVER

COLOR COMPOSITIONS AND METHOD

BACKGROUND OF THE INVENTION

This invention relates to color compositions for use in a wide variety of coloring applications. In particular, the invention relates to mixtures of pigments capable of producing consistent, compatible and predictable color effects. The invention relates further to a method of mixing the pigments in order to achieve the desired color effects.

Common, reflected, non-luminescent color compositions or pigments are visible to the eye because certain wavelenths of light impinging thereon are absorbed and the remaining wavelengths, representing the color observed, are selectively reflected towards the observer. While different lighting conditions may cause the apparent color to vary, the reflected portion of the light which illuminates the common color composition is that which is received by the observer and is preceived as color.

Luminescent color compositions or pigments, for example, fluorescent and phosphorescent pigments, are those which absorb incident illuminating radiation and re-emit the absorbed radiation at the same or a different wavelength. The light which illuminates the phosphorescent or fluorescent pigment is different from the light which is received by the observer because it has been absorbed and re-emitted.

The difference between common pigments and luminescent pigments can be characterized somewhat in terms of light intensity and brilliance. More importantly, for purposes of this disclosure, the difference between common and luminescent pigments is that common pigments selectively remove or absorb illuminating radiation and luminescent pigments transmit certain wavelengths. The absorption phenomenon is sometimes referred to hereinafter as the subtractive aspect of a color composition or pigment because certain wavelengths are removed or absorbed from incoming radiation and thus never reach the observer. The transmissive effect of luminescent pigments is sometimes hereinafter referred to as the additive aspect of a color composition because the illuminating radiation, although possibly changed in wavelength, is transmitted to the observer and multiple wavelengths combine to produce the observed color.

Common pigments reflect certain wavelengths and require a source of illuminating radiation to be visible.

Luminescent materials may be divided into two general catagories; that is, fluorescent materials and phosphorescent materials. Fluorescent materials are characterized by a relatively short time, for example, $10^{-8}$ seconds between absorption of illuminating radiation and re-emission. Fluorescent materials produce vivid colors which appear to glow-in-the-daylight.

Phosphorescent materials are characterized by a time greater than $10^{-8}$ seconds between absorption and re-emission. Phosphorescent materials, in effect, store the energy of the incident radiation and re-emit it over a longer time so that phosphorescent materials appear to glow in the absence of illuminating radiation, i.e., they glow-in-the-dark.

Common pigments are available for use in an almost unlimited variety of colors, shades, hues and intensities. Fluorescent pigments are likewise available in a rather large variety of colors, although less than the common type. Phosphorescent pigments are available in a rather limited palette of colors.

In the past, it has not been possible to produce a palette of coloring compositions that glow-in-the-dark. While some variations of color have been produced, as in Gravisse, U.S. Pat. No. 4,208,300 and Gravisse et al., U.S. Pat. No. 4,211,813, there is no teaching of how the compositions may be mixed or combined to produce a desired result in a wide variety of palette of colors. In Gravisse, for example, there is only a rough approximation of the daylight-visible and night-visible colors and there is no explanation of any method of controlling, in a precise manner, the resulting color effect. Gravisse et al., like Gravisse, uses fluorescent and phosphorescent materials to produce various color effects. In one example, Gravisse et al. also discloses the use of a common color, although in a layered fashion and not mixed with the phosphorescent and fluorescent colors.

The present invention teaches how it is possible to mix, compatibly, common and luminescent pigments so that the color effects may be accurately predicted and controlled.

Of importance to the understanding of the present invention, it is a fact that it has been discovered that color pigments may be characterized by their additive or transmissive aspect or by their subtractive or absorptive/reflective aspect. When the wavelengths of the emitted light combine, the effect is said to be additive. When wavelengths of the illuminating radiation are absorbed and only selectively reflected, the effect is said to be subtractive.

Primary colors are those which, when mixed together, produce other colors. The primary additive colors are RED, BLUE and GREEN. The primary subtractive colors are RED, YELLOW and BLUE. The primary colors mentioned also have compliments which, when combined in accordance with the teachings of the present invention, will produce other colors. However for purposes of this disclosure, the above mentioned primary colors will be discussed exclusively.

While there is some theoretical basis for a four-color primary system using RED, YELLOW, GREEN and BLUE, a practical system has not been developed which takes cognizance of both the additive and the subtractive aspects of primary colors. In other words, either colors are mixed additively by the combination of various wavelengths of light, or they are mixed subtractively so that selected wavelengths may be removed or absorbed and other wavelengths may be reflected.

It is an aspect of the present invention that a system and method of coloration had been developed which allows colors to be mixed both additively and subtractively. Additive aspects are accounted for separately from subtractive aspects, but certain rules of mixing are observed to prevent undesirable loss of color or browning.

bined additive and subtractive aspects. Column 7 is the dominant wavelength or (complement) of each color in nm.

TABLE I

| Position on Color Wheel | Popular Name | C.I.E. | Primary Additive | Primary Subtractive | Combined Symbol | Dominant Wavelength (nm) |
| --- | --- | --- | --- | --- | --- | --- |
| A | Red | Reddish/Orange | R | (R) | R | 620 nm |
| B | | Orange | | | | 590 |
| C | YELLOW* | Yellow | ½[RG] | (Y) | Y | 577 |
| D | | Yellow/Green | | | | 563 |
| E | GREEN* | Yellowish/Green | G | ½(BY) | G | 542 |
| F | | Green | | | | 507 |
| G | | Bluish/Green | | | | 491 |
| H | | Blue | | | | 475 |
| I | BLUE | Purplish/Blue | B | (B) | B | 462 |
| J | | Purple | | | | 560* (Comp) |
| K | | Purplish/Pink | | | | 520* (Comp) |
| L | | Red | | | | 492* (Comp) |
| W | | White | ⅓[RGB] | | | |
| — | | Brown/Br. | | ⅓(RBY) | | |

Complements (assigned wavelength)

SUMMARY OF INVENTION

There has been provided coloring compositions of common pigments, fluorescent pigments and phosphorescent pigments in selected proportions so that resulting mixtures of pigments exhibit an apparent observed color as perceived by an observer which is consistently predictable and controllable under illuminating radiation and in the absence of illuminating radiation. Appropriately selected amounts of each of the common pigments, fluorescent pigments and phosphorescent pigments are mixed, taking into account that the pigments absorb selected wavelengths of illuminating radiation in order to produce color effect and emit certain wavelengths which combine to produce a color effect, the combined effects of such color effects produce the observed color.

A method of compatibly mixing the pigments is disclosed using a color wheel and an algebraic system of notation in order to separately account for the additive and subtractive aspects of the pigments.

DESCRIPTION OF THE PREFERRED EMBODIMENT

Figure 1:
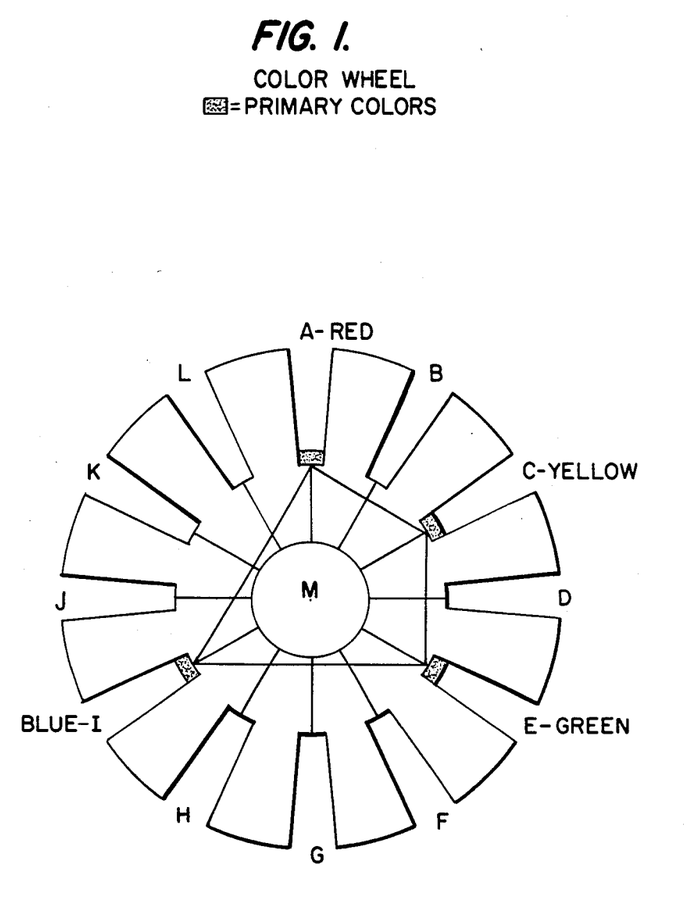
FIG. 1 is a representation of a color wheel developed in accordance with the principles of the present invention and useful in understanding the additive and subtractive aspects of various primary colors. The drawing includes a four-sided figure having vertices at the hatched rectangles representing the four primary colors used in describing the present invention.

In accordance with the present invention, reference is directed to FIG. 1 wherein general principles of the present invention may be explained.

FIG. 1 describes a color wheel in which colors are designated by the letters A-M. Certain colors (A, C, E and I) are labeled by their popular name; for example, RED, YELLOW, GREEN and BLUE. These colors are referred to as primary colors. Scientific names for the colors A-M, listed in Table I below, are taken from the so-called C.I.E. chromaticity diagram.

Table I below lists certain colors by popular name and by scientific name along with a particular system of notation hereinafter described. Column 1 of Table I designates the position of the color on the color wheel of FIG. 1. Column 2 designates the popular name for the primary colors used throughout this discussion. Column 3 designates the scientific name of each color on the wheel. Column 4 designates the symbol for the additive aspect of each primary color. Column 5 designates the symbol for the subtractive aspect of each primary color. Column 6 designates the symbol for the respective primary color when referring to its com- In the above table, the symbol R represents the additive aspect of the primary color RED. The symbol R in a formulation means quantitatively that one part RED is used to form the color mixture described in the formulation as hereinafter described.

For purposes of this discussion, primary YELLOW may be symbolized additively as the ratio RG/2 or 0.5R:0.5G. In other words, one-half part RED plus one-half part GREEN produces the additive aspect of YELLOW.

Similarly, GREEN is symbolized additively as G. However, subtractively GREEN is symbolized as (BY)/2 or 0.5(B):0.5(Y). When accounting for the subtractive aspect of GREEN in a formulation, the foregoing symbols are used as equivalents.

In accordance with the invention, additive YELLOW is symbolized by equal parts of the additive aspects of the adjacent primaries on the color wheel; namely, RED and GREEN. Similarly, subtractive GREEN is symbolized by the subtractive aspects of equal parts of the subtractive aspects of the adjacent primaries on the color wheel; namely, YELLOW and BLUE.

WHITE has an additive aspect which is symbolized by equal parts of RED, GREEN and BLUE. Similarly, subtractive BROWN is symbolized by equal parts of the subtractive aspects of RED, BLUE and YELLOW. In the following examples, the symbols are combined algebraically; that is, if two R's appear in the formulation, then two parts RED should remain or be conserved in the resulting color produced by the mixture of RED with another color. For example, according to Table I, one part each of R, G and B form WHITE. However, as stated above, R symbolizes one part RED, similarly G and B each symbolize one part each of GREEN and BLUE. Thus, a combination of R, G and B together symbolize three parts WHITE. It is important to remember in the description of the examples that the relative amounts of the resulting materials are the same as the relative amounts of the starting materials.

In accordance with the principles of the present invention, when it is desired to mix one pigment with another, the relative proportions of the additive and subtractive components are accounted for in accordance with the system of notation. An algebraic-like substitution of symbols is used whereby a resulting color may be predicted.

The primary colors on the color wheel of FIG. 1 may be combined into four groups along each of the compatible mixing lines designated by their popular names and letters as follows: RED to YELLOW: A-C; YELLOW to GREEN: C-E; GREEN to BLUE: E-I; and BLUE to RED: I-A.

Various mixtures of BLUE and RED, for example, will yield colors ranging from BLUE through PURPLE and PINK to RED. Similarly, mixtures along the RED-YELLOW line produce various degrees of RED, ORANGE and YELLOW. Mixtures along compatible mixing lines are relatively easy to predict. For example, equal parts of YELLOW and GREEN produce a GREENISH-YELLOW. Two parts GREEN and one part BLUE produce a GREENISH-BLUE and so forth. However, when it is desired to mix colors taken from adjacent or opposite lines, then care must be taken to avoid the loss of color or browning which often occurs when colors are not properly mixed.

In the present invention, when light having wavelengths in the RED, GREEN and BLUE lines combine, the resulting color produced has a WHITE appearance. If, however, light having a wavelength in the YELLOW line is mixed with the foregoing wavelengths, the perceived color takes on a YELLOWISH tint. In the foregoing example, RED, GREEN, BLUE and YELLOW are mixed additively. When RED, GREEN, BLUE and YELLOW are mixed subtractively, the result is quite different. The RED, BLUE and YELLOW lines produce BROWN modified by the GREEN. The predominant effect, however, will be a BROWN color which is generally disfavored aesthetically. Thus, it is important to avoid certain combinations of colors if one wishes to obtain aesthetically pleasing results when the resulting mixture is observed under ambient illumination and in the dark.

Examples 1-10 are algebraic exercises designed to illustrate to the colorist how, beginning with symbols representing starting materials of a given characteristic color, the colorist can predict the resulting additive and subtractive aspects of the colors resulting from the mixture of such starting materials.

Figure 2:
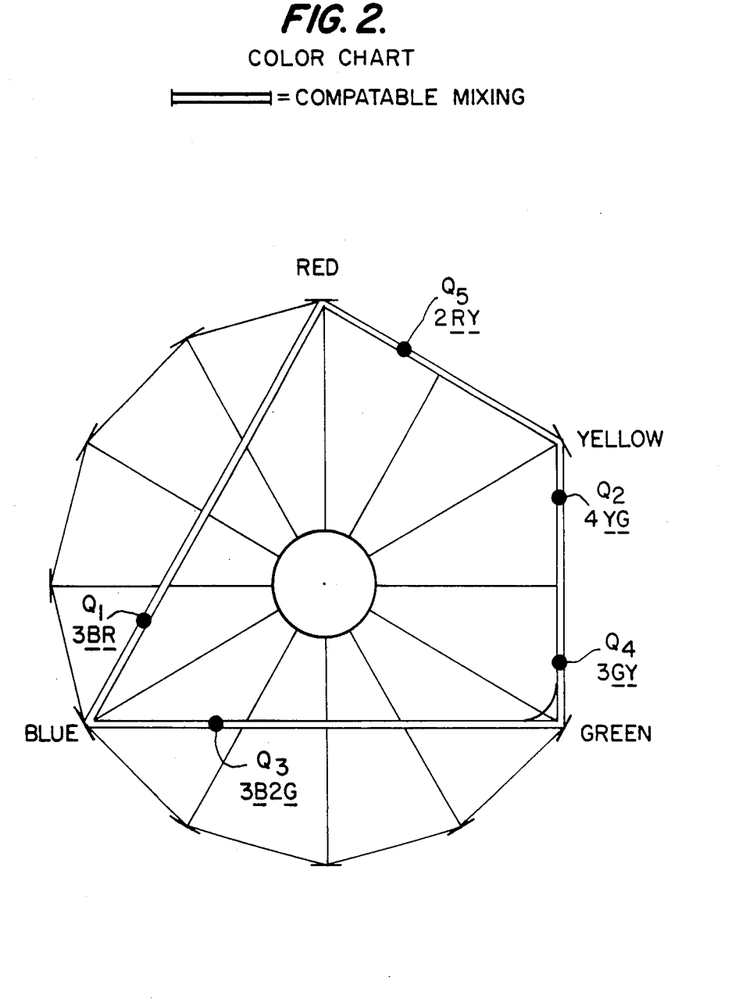
FIG. 2 is an enlarged representation of the compatible mixing lines of additive and subtractive colors superimposed on an enlarged central portion of the color wheel of FIG. 1.

The following Examples 1-6 represent the results when all of the major combinations of colors are combined along each of the four compatible mixing lines A-C, C-E, E-I and I-A above. In the first three Examples, symbols representing the colors RED-YELLOW are combined with symbols representing YELLOW-GREEN, GREEN-BLUE, and BLUE-RED respectively. Examples 4-5 illustrate symbolically the resulting predicted colors when symbols along YELLOW-GREEN lines are combined algebraically with symbols along GREEN-BLUE lines and BLUE-RED, respectively. Example 6 shows the combination of the symbols along the GREEN-BLUE and BLUE-RED lines. FIG. 2 shows symbolic color mixtures Q1-Q5. Examples 7-10 illustrate the result when combinations of symbolic colors Q1-Q5 are mixed in which the relative proportion of the primaries along any mixing line are unequal. In other words, a symbolic color Q5, formed of two parts RED and one part YELLOW, may be mixed with a symbolic color Q4 formed of three parts GREEN and one part YELLOW along an adjacent compatible mixing line.

In accordance with the present invention, a procedure is outlined which will assist the colorist in accounting for the various proportions of colors, both additively and subtractively. The procedure operates as follows:

Procedure (1) Symbolize a proposed mixture of colors by popular name and symbol: RED: R GREEN: G BLUE: B YELLOW: Y (2) Separate symbols by colors into equivalent units (or parts) of additive and subtractive aspects:
  RED: R(R); GREEN: G(G); BLUE: B(B); YELLOW: Y(Y)
  EQUIVALENTS: GREEN: G=(0.5Y:0.5B); YELLOW: 0.5R:0.5G=(Y)

(3) Separately combine additive aspect symbols and subtractive aspect symbols and express the results as a ratio of units or parts:
  R:G:B0.5R:0.5G Additive
  (R:0.5Y:0.5B:B:Y) Subtractive (4) Use equivalent terms from Table I to represent known combinations of additive and subtractive aspects, e.g.:
  RGB=3W (RYB=3Br)
  RB=2Y (BY=2G)

(5) Substitute the expressions from step 4 into expressions resulting from step 3 to find the resulting additive and subtractive aspects of the proposed mixture:
  3W:Y Additive result: YELLOWISH-WHITE
  3Br:G Subrtactive result: GREENISH-BROWN By using the above procedure, the colorist can use symbols to search for a desired result.

EXAMPLE 1

Combine the symbols along RED-YELLOW with the symbols along YELLOW-GREEN:

In Example 1, the algebraic result of combining color symbols R-Y for RED-YELLOW and Y-G for YELLOW-GREEN results in a prediction of the additive aspect and the subtractive aspect of a color which would result were the colorist to combine pigments having the characteristics of the symbols R-Y with pigments having the characteristics of the symbols Y-G. The predicted result would be a pigment having a strong YELLOW additive aspect and an ORANGE-BROWN subtractive aspect. Thus, the material would glow-in-the-dark in the YELLOW and would appear ORANGE-BROWN under ambient illumination.

| RY - YG | |
|---|---|
| Additive: | |
| R:2Y:G | |
| R:2[.5R:.5G]:G | |
| R:R:G:G | |
| 2R:2G | |
| 4Y | YELLOW |
| Subtractive: | |
| (R:2Y:.5B:.5Y) | |
| (1.5Br:.5R:2Y) | ORANGE-BROWN |

EXAMPLE 2

Combine symbols along the RED-YELLOW with symbols along the GREEN-BLUE:

| RY - GB | |
|---|---|
| Additive: | |
| R:Y:G:B | |

-continued

| RY - GB | |
|---|---|
| R:G:B:.5R:.5G | |
| 3W:Y | YELLOWISH-WHITE |
| Subtractive: | |
| (R:Y:B:.5Y:.5B) | |
| (3Br:G) | GREENISH-BROWN |

In Example 2, the colorist can predict that a mixture of pigments having characteristics similar to the R-Y when mixed with pigments having characteristics similar to the G-B will result in a pigment having a YELLOWISH-WHITE additive aspect and a GREENISH-BROWN subtractive aspect. Thus, it will appear to glow YELLOWISH-WHITE in the dark and will appear as a GREENISH-BROWN under ambient illumination.

Examples 3-6 show the starting symbols, the intermediate substitution of equivalent symbols where necessary and the predicted result.

EXAMPLE 3

| RY - BR | |
|---|---|
| Additive: | |
| R:.5R:.5G:B:R | |
| 2R:.5B 1.5W | PURPLEISH-WHITE |
| Subtractive: | |
| (R:Y:B:R) | |
| (3Br:R) | REDDISH-BROWN |

EXAMPLE 4

| YG - GB | |
|---|---|
| Additive: | |
| .5R:.5G:G:G:B | |
| 2G:.5B:1.5W | WHITEISH-BLUEISH-GREEN |
| Subtractive: | |
| (Y:G:G:B) | |
| (Y 2[.5Y:.5B]:B) | |
| (Y:Y:B:B) | |
| (4G) | GREEN |

EXAMPLE 5

| YG - BR | |
|---|---|
| Additive: | |
| Y:G:B:R | |
| Y:3W | |
| 3W:Y | YELLOWISH-WHITE |
| Subtractive: | |
| (Y:G:B:R) | |
| (G:3BR) | GREENISH-BROWN |

EXAMPLE 6

| GB - BR | |
|---|---|
| Additive: | |
| G:B:B:R | |
| B:3W | BLUEISH-WHITE |
| Subtractive: | |
| (G:B:B:R) | |
| (.5Y.5B:B:B:R) | |

| GB - BR | |
|---|---|
| (2B:.5R:1.5Br) | BROWNISH-PURPLE |

In the following Examples 7-10, proportional combinations of symbols are illustrated. Thus, in Example 7, the algebraic exercise illustrates how the colorist can predict the result when a symbolic color Q1 made up of three parts BLUE and one part RED is combined with a symbolic color Q2 made up of four parts YELLOW and one part GREEN.

EXAMPLE 7

| Q1 + Q2 | |
|---|---|
| From FIG. 2: | |
| Q1=3B:R | (4 parts) |
| Q2=4Y:G | (5 parts) |
| Additive: | |
| 3B:R + 4Y:G | (9 parts) |
| 3B:R:4Y:G | |
| 3B:R:4[.5R:.5G]:G | |
| 3B:R:2R:2G:G | |
| 3B:3R:3G | |
| 9W | WHITE (9 parts) |
| Subtractive: | |
| (3B:R:4Y:G) | (9 parts) |
| (3B:R:4Y:.5B:.5Y) | |
| (3.5B:R:4.5Y) | |
| (3Br:5G:Y) | BROWNISH-YELLOWISH-GREEN |
| | (9 parts) |

In Example 7, the result of combining symbols representing the symbolic colors Q1 and Q2 results in a prediction in which the additive aspect of a resulting pigment would be bright or strong WHITE in the additive and BROWNISH-YELLOWISH-GREEN in the subtractive.

EXAMPLE 8

| Q3 + Q4 | (9 parts) |
|---|---|
| 3B:2G + 3G:Y | |
| Additive: | |
| 3B:2G:3G:.5R:.5G | |
| 1.5W:2.5B:5G | WHITEISH-BLUEISH-GREEN |
| Subtractive: | |
| (3B:2G:3G:Y) | |
| (3B:5G:Y) | |
| (3B:5[.5Y:.5B]:Y) | |
| (5.5B:3.5Y) | |
| (7G:2B) | BLUEISH-GREEN |

EXAMPLE 9

| Q5 + Q2 | (8 parts) |
|---|---|
| 2R:Y + 4Y:G | |
| Additive: | |
| 2R:.5R:.5G:4[.5R:.5G]G | |
| 4.5R:3.5G | |
| 7Y:R | REDDISH-YELLOW |
| Subtractive: | |
| (2R:Y:4Y:.5Y:.5B) | |
| (5Y:1.5R:1.5BR) | REDDISH-BROWNISH-YELLOW |

In the foregoing Examples, combinations of various symbols along each of the compatible mixing lines AC, CE, EI and IA in FIG. 2 and combined separately, taking into account additive and subtractive aspects of colors. As hereinbefore stated, the additive aspect is the aspect which represents the addition or combination of wavelengths to produce a resulting observable color. The subtractive aspect is equivalent to the absorption of certain wavelengths and reflection of others whereby the observed color is perceived.

Colored pigments may be blended in accordance with the principles of the present invention in order to form any other colored pigments. In the present invention, RED, YELLOW, GREEN and BLUE are designated primary colors from which all other colors of the palette may be produced by varying one or more proportions of said primaries with respect to each other. Because the YELLOW and GREEN do not, for the purposes of this discussion, have both additive and subtractive aspects, YELLOW is converted to equal parts RED and GREEN when considering the additive effect of YELLOW on a combination, and GREEN is converted to equal parts of BLUE and YELLOW in order to account for the subtractive effect of GREEN on a mixture.

If the additive aspect of a resulting color does not match the subtractive aspect of the resulting color, the original colors are said not to be fully compatible for mixing under the system of the present invention. Colors along any compatible mixing line may be mixed together as mentioned above to produce different gradations of the primary colors at the extremities of such lines. Except for mixing lines YELLOW-GREEN and GREEN-BLUE (FIG. 2), mixing of colors on adjacent lines will produce colors having incompatible or non-matching additive and subtractive aspects. The rounded corner between YELLOW-GREEN and GREEN-BLUE indicates that compatible color mixtures occur around the corner. However, even though mixtures of colors additively and subtractively may not be compatible, pleasing and predictable results may occur.

If it is desired to have a special effect in which the observed color under ambient illumination is different from the observed color in the dark, then a mixture such as Q1 and Q4 would produce the following results:

EXAMPLE 10

| Q1 + Q4 |  |
|---|---|
| 3B : R + 3G : Y |  |
| Additive: |  |
| 3B:R:3G:Y |  |
| 3B:R:3G:.5R:.5G |  |
| 4.5W:1.5B:2G | BLUEISH-GREENISH-WHITE |
| Subtractive: |  |
| (3B:R:3[.5Y:.5B]:Y) |  |
| (3B:R:1.5Y:1.5B:Y) |  |
| (R.5B:2.5Y:R) |  |
| (3G:3B4:2B) | BROWNISH-BLUEISH-GREEN |

It is often desirable to avoid browning or loss of color when mixing various colors. Thus care must be exercised in order not to lose the aesthetic value of the conventional colors when producing the phosphorescent colors.

In one embodiment of the present invention, common pigments, fluorescent pigments and phosphorescent pigments may be mixed using the relationships set forth in the examples. The pigments are mixed by eye in selected proportions to achieve a target or desired color which may be described by a dominant wavelength or by means of coordinates (xy) designated on the known C.I.E. chromaticity diagram (Kelly-Chart). For example, the RED colors of the electromagnetic spectrum lie in the relatively long wavelength range. A target RED value may be arbitrarily selected to have C.I.E. coordinates of about (0.62x, 0.34y) and an apparent color having a dominant wavelength or color center near about 615 nm. Various pigments may then be mixed to achieve the desired result. For example, common pigments made by various manufacturers may be mixed with fluorescent pigments and phosphorescent pigments to arrive at the particular color. Having designed a particular RED or YELLOW or GREEN or BLUE by selectively mixing the pigments for each primary, combinations of the primaries may then be selectively and proportionately mixed to produce intermediate colors.

The eye is an excellent null detector; that is, the eye can detect a color match, but it is not possible to tell by eye the precise color center or dominant wavelength without the aid of an instrument, such as a spectrophotometer. Such an instrument is extremely expensive. However, for purposes of the method discussed, colors may be mixed by eye using calculated or graphically determined C.I.E. coordinates or dominant wavelengths in order to obtain satisfactory results. In other words, colors representing the primaries may be mixed by combinations of phosphorescent, fluorescent and common pigments to reach a particular known primary. There are many known systems for quantifying colors; for example, C.I.E. Kelly-Chart, Munsell and Adams-Nickerson methods. For purposes of this invention, however, calculation by such methods or known systems may be used to confirm the results which can be approximately obtained by eye.

Figure 3:
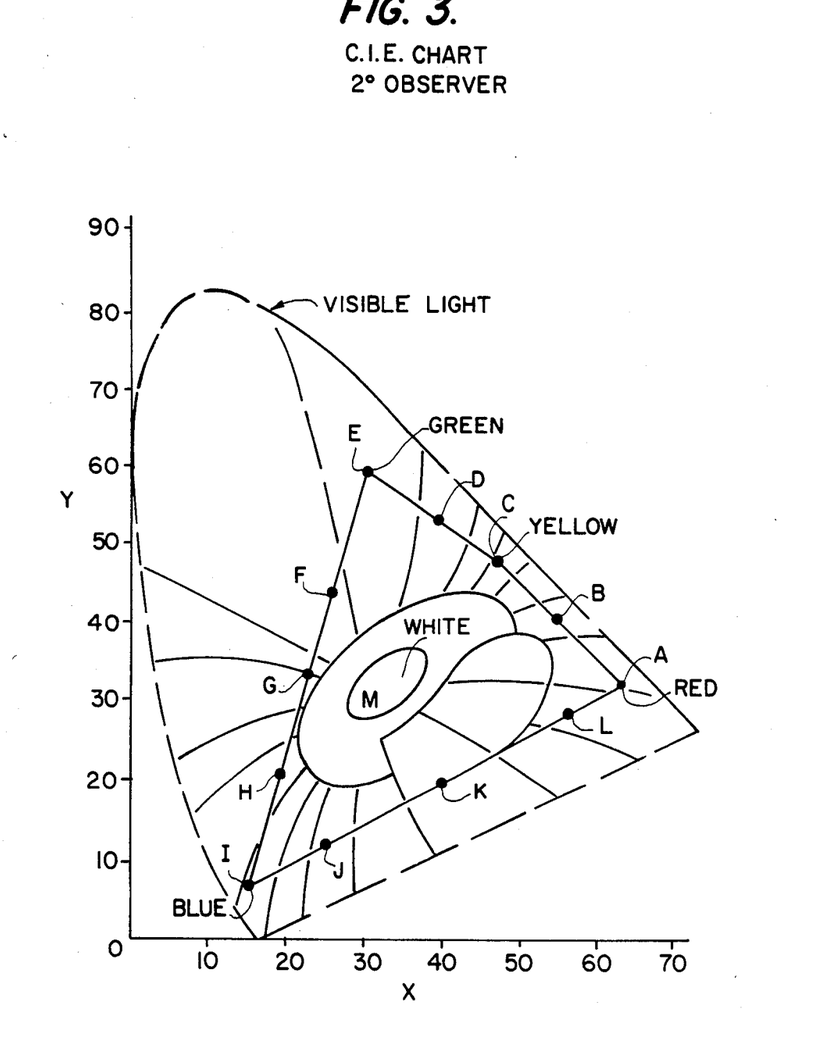
FIG. 3 is a representation of the C.I.E. chromaticity diagram (Kelly-Chart 2° observer) with points representing target colors of certain examples noted.

Using the method of the present invention, a palette of colors can be produced which is hereinafter set forth in Example 11. C.I.E., Kelly-Chart coordinates, for example, 11A–11M are shown in FIG. 3 as points A–M respectively. Variations and gradations of the following examples may be further combined to produce many more phosphorescent or glow-in-the-dark colors than has heretofore been possible. The present invention provides a tool for mixing materials having dual and often incompatible aspects to produce aesthetically pleasing results. In accordance with the present invention, the palette of colors may be produced over the entire visible electromagnetic spectrum.

EXAMPLE 11

| Color | P | F | C | L | (x,y) |
|---|---|---|---|---|---|
| 11A | 90–95 | 1–5 | 1–3 | 610–630 | (.625,.325) |
| Reddish- | 92.5 | 5 | 2.5 | 620 | |
| Orange | (2304) | (Z-15) | Cadmium Scarlet (RED) | | |
| 11B | 68–75 | 1–5 | 0.5–2.5 | 585–595 | (.540,.410) |
| Orange | 70 | 5 | 2 | 590 | |
|  | (2304) | (Z-16) | Cadmium Orange | | |
|  | 20–26 |  |  | | |
|  | 23 |  |  | | |
|  | (2330) |  |  | | |
| 11C | 42–47 | 3–8 | 0.5–2 | 575–580 | (.470,.480) |
| Yellow | 45.5 | 7.5 | 1.5 | 577 | |
|  | (2304) | (Z-17) | Cadmium Yellow | | |
|  | 42–47 |  |  | | |
|  | 45.5 |  |  | | |
|  | (2330) |  |  | | |
| 11D | 20–25 | 1–3 | 0.5–2.5 | 562–567 | (.385,.540) |
|  | 23 | 3 | 2 | 563 | |

-continued

| Color | P | F | C | L | (x,y) |
|---|---|---|---|---|---|
| | (2304) | (Z-17) | Cadmium Green | | |
| | 67-72 | 1-3 | | | |
| | 69 | 3 | | | |
| | (2330) | (Z-18) | | | |
| 11E | 84-95 | 4-8 | 0.5-2.5 | 537-545 | (.290,.600) |
| | 91.5 | 7.5 | 1 | 542 | |
| | (2330) | (Z-18) | Veridian Green | | |
| 11F | 5-10 | 1-4 | 0.5-2.5 | 507-510 | (.250,.450) |
| | 9 | 4 | 2 | 507 | |
| | (2479) | (Z-18) | Cobalt Green | | |
| | 80-87 | 1-3 | | | |
| | 83 | 2 | | | |
| | (2330) | (Z-19) | | | |
| 11G | 21-25 | 2-6 | 0.5-1.5 | 491-494 | (.220,.340) |
| | 23.5 | 5 | 1 | 491 | |
| | (2479) | (Z-19) | Cobalt Blue | | |
| | 68-74 | | | | |
| | 70.5 | | | | |
| | (2330) | | | | |
| 11H | 42-48 | 2-8 | 0.5-1.5 | 472-478 | (.185,.210) |
| | 46 | 7 | 1 | 475 | |
| | (2479) | (Z-19) | Ultramarine Blue | | |
| | 42-48 | | | | |
| | 46 | | | | |
| | (2330) | | | | |
| 11I | 88-95 | 2-4 | 0.5-1 | 455-465 | (.150,.070) |
| | 90.5 | 3 | 1 | 462 | |
| | (2479) | (Z-19) | Ultramarine Blue | | |
| | | 2-6 | 0.5-1.5 | | |
| | | 5 | .5 | | |
| | | (Z-21) | Cobalt Violet | | |
| 11J | 37-42 | 2-6 | 0.5-2.5 | Comp. | (.250,.125) |
| | 39 | 6 | 2 | 555-565 | |
| | (2304) | (Z-21) | Cobalt Violet | 560 | |
| | 48-55 | | | | |
| | 53 | | | | |
| | (2479) | | | | |
| 11K | 65-70 | 2-4 | 0.5-2 | Comp. | (.390,.200) |
| | 68 | 3 | 2 | 518-522 | |
| | (2304) | (Z-12) | Cobalt Violet | | |
| | 20-25 | 2-4 | | | |
| | 23 | 4 | | | |
| | (2479) | (Z-21) | | | |
| 11L | 85-94 | 2-6 | 0.5-2.5 | Comp. | (.550-.285) |
| | 86 | 5.5 | 1.5 | 485-495 | |
| | (2479) | (Z-13) | Cadmium Red | 492 | |
| | 5-10 | | | | |
| | 7 | | | | |
| | (2304) | | | | |
| 11M | 35-40 | 10-15 | | 380-760 | Oval Boundry |
| | 38.5 | 10 | | | (.37,.36) |
| | (2304) | (HM-35) | | | (.27,.34) |
| | 35-40 | | | | (.29,.27) |
| | 38.5 | | | | (.27,.33) |
| | (2330) | | | | |
| | 10-25 | | | | |
| | 13 | | | | |
| | (2479) | | | | |

P = Phosphorescent pigment in weight percent with USR code in parenthesis
F = Fluorescent pigment in weight percent with Day-Glo code in parenthesis
C = Common pigment in weight percent with common name
L = Wavelength in nm
(x,y) = C.I.E. Kelly Chart 2° observer coordinates
Pigments are listed in columns P F and C by range of weight percent, preferred weight percent and name or code; in column L by range of wavelength and preferred wavelength (or compliment).

In order for the appearance or observed color produced in accordance with the present invention to be similar in the presence of ambient illumination and in darkness, each phosphorescent pigment, common pigment and fluorescent pigment used to produce a particular primary color, for example, should be near or be dominated by the same or similar wavelengths.

For the basic colors used by artists and manufacturers, the listing of wavelengths in the last column of Table I represents a preferred center or dominant wavelength for each respective named color. It should be understood however other color centers may be chosen and used as well.

Any of a plurality of known dry powdered common pigments may be used in combination with dry powdered fluorescent pigments and dry powdered phosphorescent pigments to produce the primary colors. Once produced other colors may be created by means of mixing two or more primary colors. Exemplary common pigments are manufactured by M. Grumbacher, New York, N.Y. A variety of fluorescent pigments are manufactured by Day-Glo Corporation, Cleveland, Ohio. Phosphorescent pigments are available from USR Optomics, Hacketstown, N.J. The pigments may be characterized by their spectral response. Thus, when the chromaticity coordinates or the dominant wavelength is specified, the resulting observed color can be predicted.

The most commonly known phosphorescent pigments are sulfides of zinc, calcium, strontium and cadmium.

Preferably an ultraviolet absorber is combined with common, fluorescent and phosphorescent pigments in order to protect the phosphorescent and fluorescent pigments from degradation caused by ultraviolet rays which may be present in the incident radiation. An exemplary ultraviolet absorber is anthracene and PP (diaphenyloxazolen). Other well kown substances are also available.

The relative amounts of the components may vary widely within the scope of the invention. In most cases, however, the following ranges of weight percentages based upon the total of the four components noted above will provide the best results.

TABLE II

| Component | Preferred Range |
|---|---|
| Common Phenomenon-Pigment | 0.2-3.0% |
| Phosphorescent Pigment | 87-97.8% |
| Fluorescent Pigment | 2-10% |
| UV Light Absorber | .1-2%* |

*UV Absorber may be provided as part of a material containing the color pigments (e.g., plastic binder) or as an over-lay or as a component in the .1-2% by weight range noted above.

The composition may further include additional ingredients, such as those generally used in paints, dye carriers, inks and other coloring compositions, depending upon the physical properties sought, the use to which the material will be put, the substrate onto which the composition will be applied or other application. For example, the pigments may be combined with translucent plastics, resins and natural and synthetic rubbers.

What is claimed is:

1. A method of preparing a desired photoluminescent color pigment having a predictable color and spectral response under ambient illuminating radiation and in the dark, comprising the steps of: choosing at least one target color having a dominant wavelength and selected spectral response in the presence of ambient illuminating radiation and in the dark; and mixing by weight about 87-97.8% phosphorescent pigments, about 2-10% fluorescent pigments and about 0.2-3% common pigments, each having a dominant wavelength and spectral response near said target color, to produce said spectral response.

2. A method in accordance with claim 1 further comprising the steps of: choosing at least one of four primary target colors having dominant wavelengths near 620 nm (RED), 557 nm (YELLOW), 342 nm (GREEN) and 462 nm (BLUE), wherein the mixing step includes: selecting respective phosphorescent, fluorescent and common pigments for each of said four primary target colors; mixing the respective pigments to produce a respective primary color pigment for each chosen primary color, which primary color pigments when mixed in various proportions, with other primary color pigments produce a palette of colors across the visible electromagnetic spectrum; determining the spectral response of various proportions of each primary color pigment separately in the presence of illuminating radiation and in the dark in order to establish selected proportions of pigments for each color in said palette of colors; and combining said primary color pigments in said selected proportions to produce the palette of colors across said visible electromagnetic spectrum.

3. A method as set forth in claim 2 wherein the RED and BLUE primary color pigments have additive and subtractive aspects and the GREEN and YELLOW primary color pigments each have an additive and subtractive aspect respectively, the YELLOW primary color pigment has an equivalent additive aspect comprising equal parts of the additive aspects of the RED and GREEN primary color pigments adjacent thereto and the GREEN primary color pigment has an equivalent subtractive aspect comprising equal parts of the subtractive aspects of each of the YELLOW and BLUE primary color pigments adjacent thereto, and the step of determining the spectral response of the various proportions of primary color pigments further includes the steps of: algebraically combining the separate additive aspects of the primary color pigments and algebraically combining the subtractive aspects of said primary color pigments, the combined additive aspects establishing the effect of emission on the resulting photoluminescent color pigment and the subtractive aspect representing the effect of absorption on the resulting photoluminescent color pigment.

4. A method of preparing photoluminescent color pigments each having a desired, predictable observable color and spectral response to illuminating radiation and in the dark comprising:
choosing a target color for each desired photoluminescent pigment, wherein the spectral response of the target color is centered near a respective dominant wavelength;
selecting about 87-97.8 weight percent phosphorescent pigment, about 2-10 weight percent fluorescent pigment and about 0.2-3 weight percent common pigment, each pigment having a spectral response centered near the respective dominant wavelength; and
combining the pigments having their spectral response centered near the respective dominant wavelength to produce photoluminescent pigments, each having said spectral response; and further comprising the steps of:
mixing a plurality of said photoluminescent pigments to produce a variety of multi-component photoluminescent pigments across the visible electromagnetic spectrum, each photoluminescent pigment including absorptive materials which absorb some wavelengths of illuminating radiation and reflect selected wavelengths thereof near the dominant wavelength and the photoluminescent pigments include emissive materials which absorb selected wavelengths of illuminating radiation and emit selected wavelengths near the dominant wavelength, and the mixing step further including the step of:
selecting photoluminescent pigments for producing the multi-component photoluminescent pigment based separately upon the absorption of illuminating radiation and the emission of radiation and the effect of absorption and emission on the spectral response of the multi-component photoluminescent pigment resulting in an observable and predictable color under illuminating radiation and in the dark.

5. A method as set forth in claim 4 comprising selecting a plurality of target colors each having a range of spectral response centered near a corresponding dominant wavelength and being distributed relatively uniformly at an optical center of a chromaticity diagram.

6. A coloring composition having a spectral response within a predetermined wavelength range, comprising:
about 0.2-3% by weight of a common pigment capable of selectively reflecting incident light within the predetermined wavelength range;
about 87-97.8% by weight of a phosphorescent pigment capable of selectively emitting radiation within said predetermined wavelength range upon excitation by incident light;
about 2-10% by weight of a fluorescent pigment capable of selectively emitting radiation within a said predetermined wavelength range upon excitation by incident light; and
about 0.1-2% by weight of an ultra violet absorber.

7. A coloring composition in accordance with claim 6 wherein the range of each of said target wavelength is about 4-10 nm wide and the apparent color is located on the C.I.E. 2° observer Kelly Chart at at least one of the following pairs of coordinates:
0.625x,0.325y
0.540x,0.410x
0.470x,0.480y
0.385x,0.540y
0.290x,0.600y
0.250x,0.450y
0.220x,0.340y
0.185x,0.210y
0.150x,0.070y
0.250x,0.125y
0.390x,0.200y
0.550x,0.285y 8. A color composition in accordance with claim 6 in which said target wavelength is at least one of about: 610-630 nm; 585-595 nm; 575-580 nm; 562-567 nm; 537-545 nm; 505-510 nm; 490-494 nm; 472-478 nm; 455-465 nm; and complements of 555-565 nm, 518-522 nm and 485-495 nm.

9. A coloring composition in accordance with claim 6 wherein the apparent color is located on a C.I.E. 2° observer Kelly Chart in an oval area bounded by the coordinates 0.37x,0.36y; 0.27x,0.34y; 0.29x,0.27y; and 0.37x,0.33y.

10. A color composition in accordance with claim 6 in which said target wavelength is at least one of about: 620 nm, 590 nm, 577 nm, 563 nm, 542 nm, 507 nm, 491 nm, 475 nm, 462 nm and complements of 560 nm, 520 nm and 492 nm.

11. A coloring composition in accordance with claim 6 in which said wave length range is approximately 4–10 nanometers in width.

12. A coloring composition in accordance with claim 6 in which said phosphorescent pigment comprises a metal sulfide selected from the group consisting of zinc sulfide, calcium sulfide, strontium sulfide and cadmium sulfide, and combinations thereof.

13. A coloring composition in accordance with claim 6 in which said target wave length range is approximately 4–10 nanometers in width, and the apparent center of said range selected from the group consisting of 620, 590, 577, 563, 542, 507, 491, 475, 462, and complements of 560, 520, and 492.

14. A coloring composition in accordance with claim 6 further comprising at least one of a light transmitting binder and a light-transmitting resin.

15. A coloring composition in accordance with claim 7 in which at least four of said C.I.E. coordinates are for primary colors and are distributed relatively symmetrically about said range, and from which said primary colors other colors may be produced.

* * * * *